Feb. 29, 1944.  G. MAXON, JR  2,342,749
CONCRETE CONSISTENCY METER
Filed Aug. 6, 1941  8 Sheets-Sheet 1

Inventor
Glenway Maxon Jr.
By [signature]
Attorney

Feb. 29, 1944.  G. MAXON, JR  2,342,749
CONCRETE CONSISTENCY METER
Filed Aug. 6, 1941  8 Sheets-Sheet 2
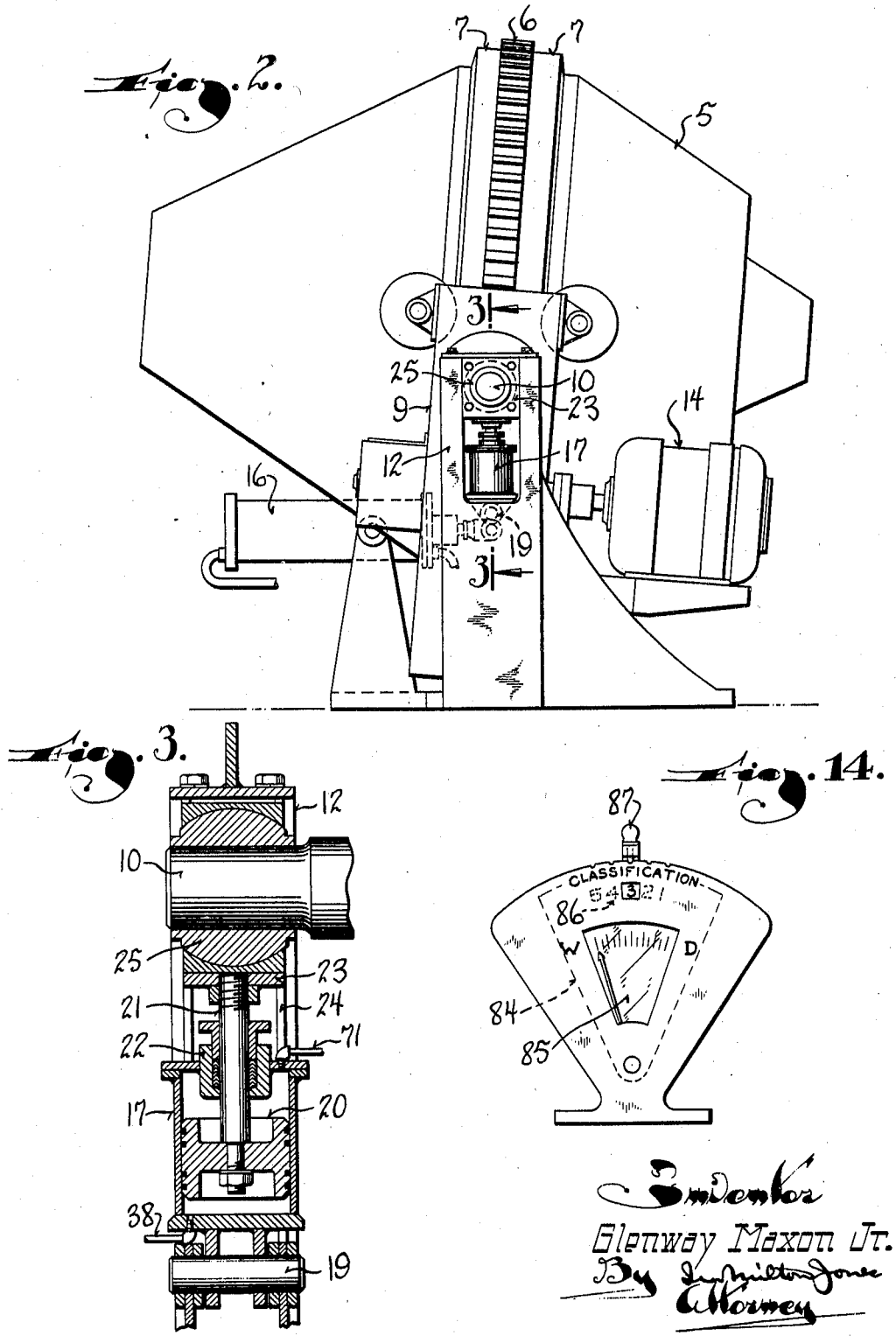

Feb. 29, 1944. G. MAXON, JR 2,342,749
CONCRETE CONSISTENCY METER
Filed Aug. 6, 1941 8 Sheets-Sheet 3
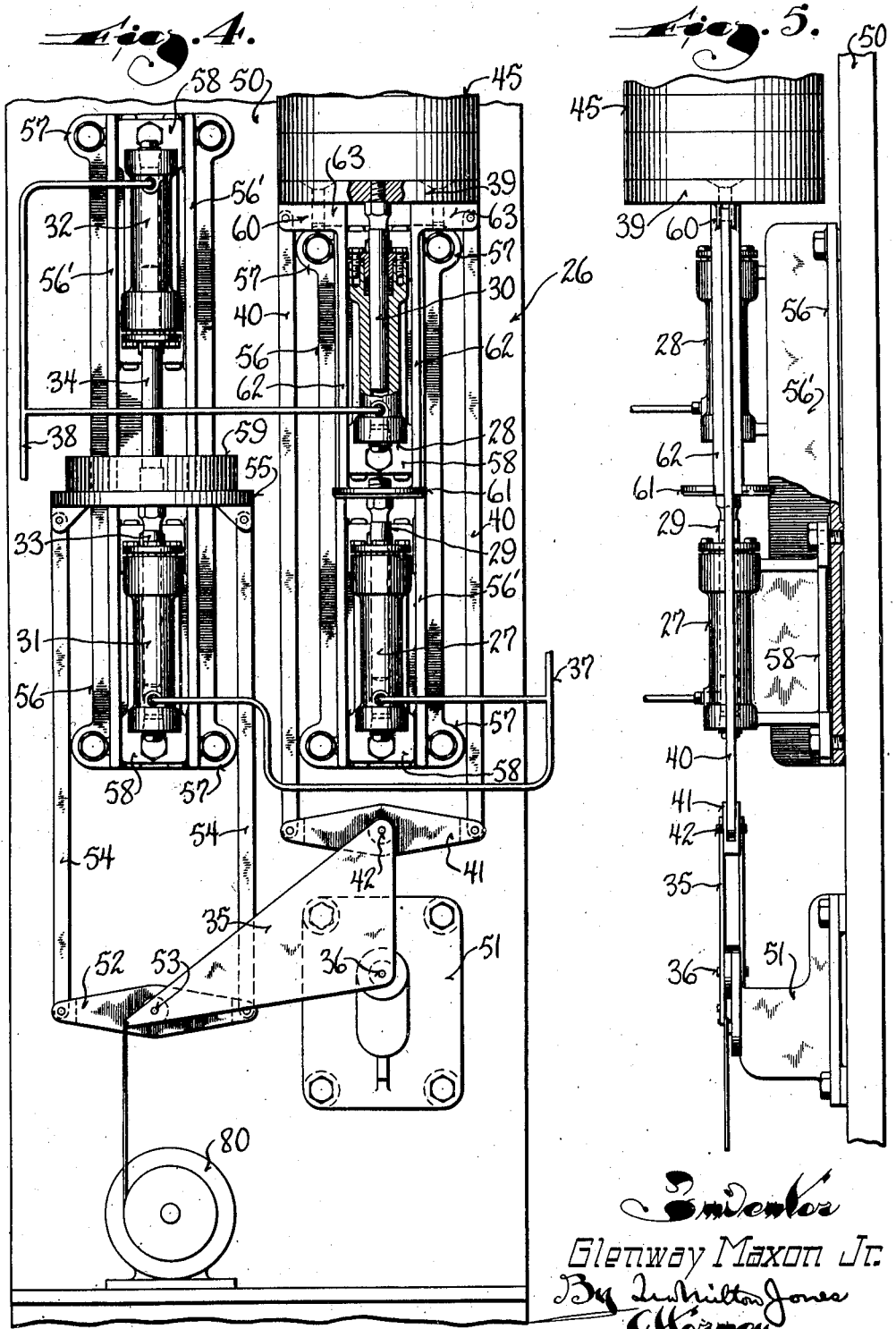
Inventor
Glenway Maxon Jr.
By Milton Jones
Attorney Feb. 29, 1944.   G. MAXON, JR   2,342,749
CONCRETE CONSISTENCY METER
Filed Aug. 6, 1941   8 Sheets-Sheet 4
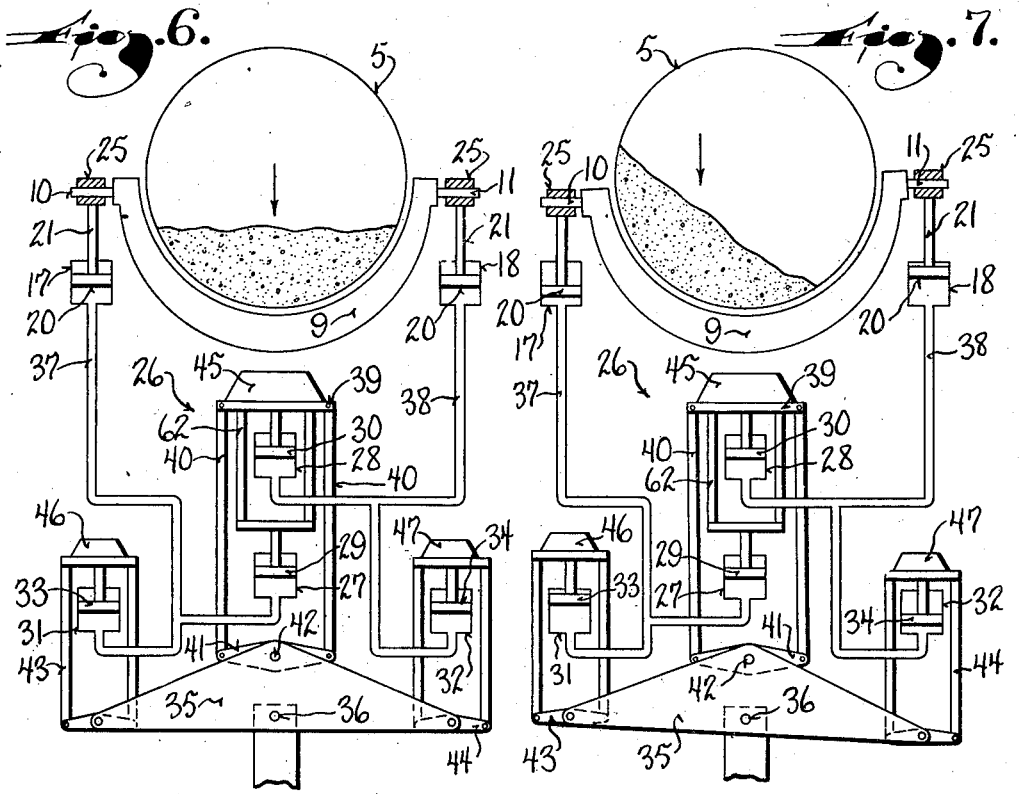
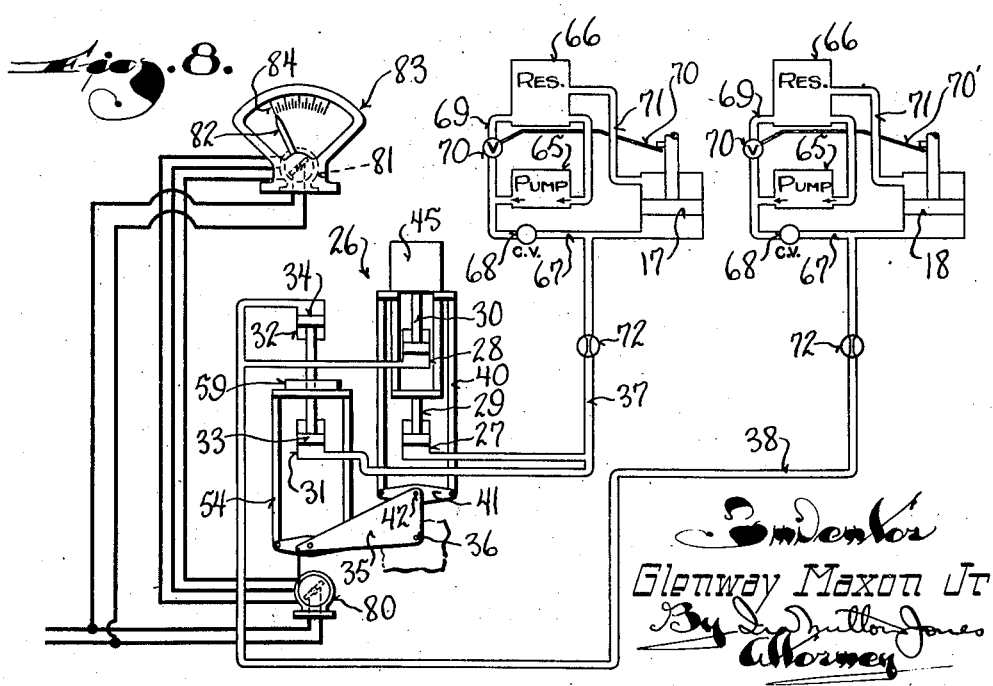

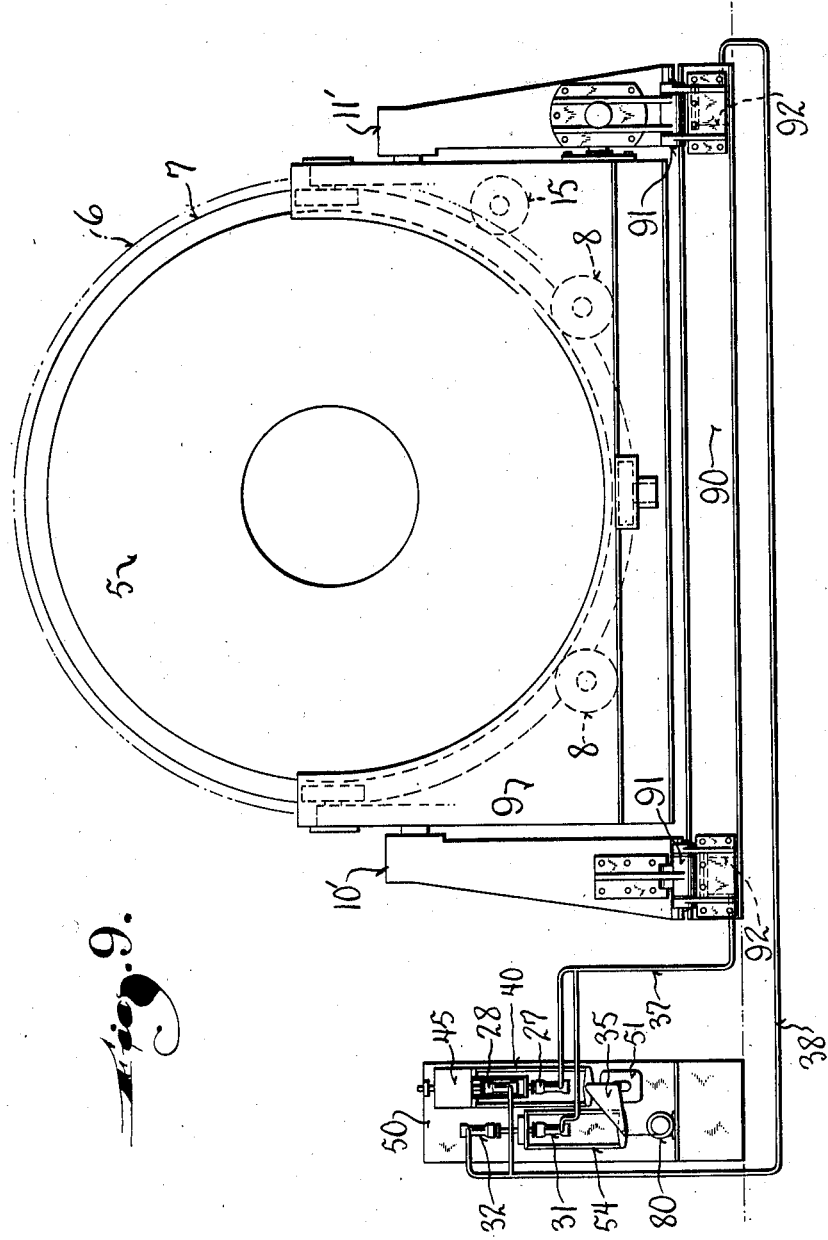

Feb. 29, 1944.    G. MAXON, Jr    2,342,749
CONCRETE CONSISTENCY METER
Filed Aug. 6, 1941    8 Sheets-Sheet 6

Inventor
Glenway Maxon Jr.
By
Attorney

Feb. 29, 1944.   G. MAXON, JR   2,342,749
CONCRETE CONSISTENCY METER
Filed Aug. 6, 1941   8 Sheets-Sheet 7
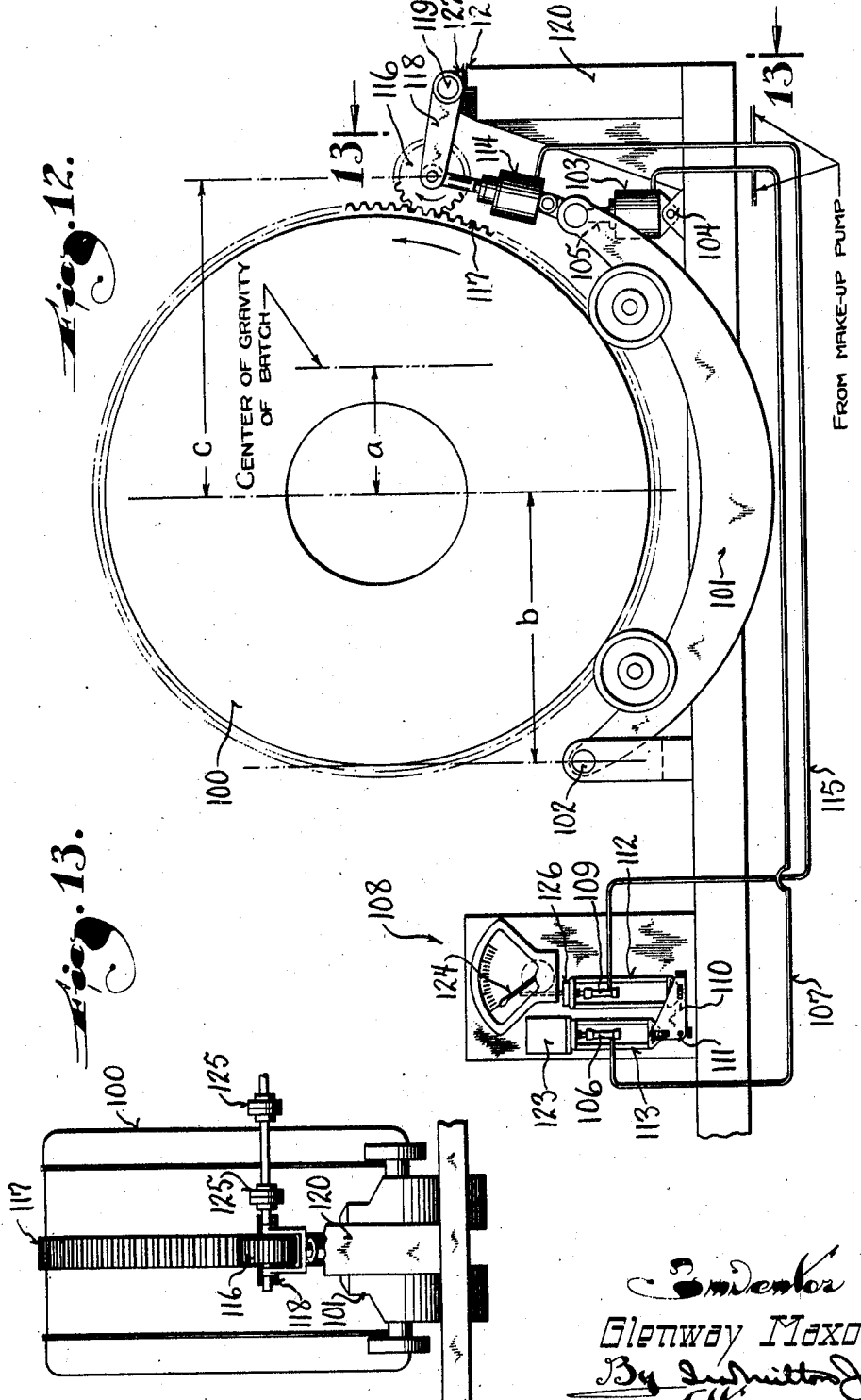
Inventor
Glenway Maxon Jr.
By
Attorney Feb. 29, 1944.　　G. MAXON, JR　　2,342,749
CONCRETE CONSISTENCY METER
Filed Aug. 6, 1941　　8 Sheets-Sheet 8
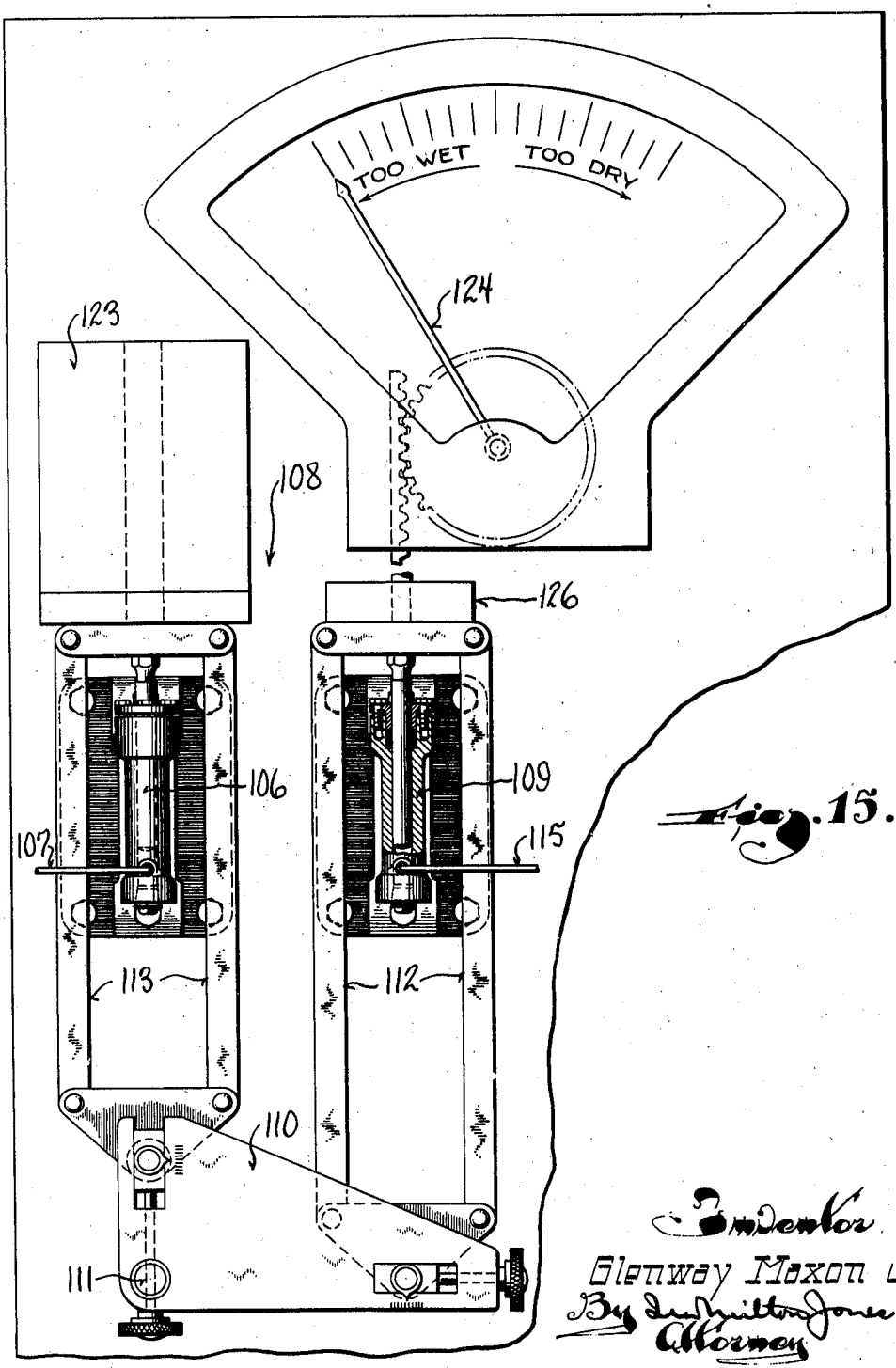

Patented Feb. 29, 1944

2,342,749

UNITED STATES PATENT OFFICE 2,342,749

CONCRETE CONSISTENCY METER

Glenway Maxon, Jr., Milwaukee, Wis., assignor to The T. L. Smith Company, Milwaukee, Wis., a corporation of Wisconsin Application August 6, 1941, Serial No. 405,580

21 Claims. (Cl. 265—11)

This invention relates to concrete mixing apparatus and has as its purpose the provision of means for accurately measuring and indicating the consistency of concrete while it is being mixed.

While the desirability of attaining this objective is not new and several different schemes have been tried in the past in an effort to accomplish this result, the desired accuracy has not been reached as all of the past schemes or their mode of application involved dependence upon the weight of the aggregates in the drum which is subject to considerable fluctuation. Even though the aggregates of each batch are carefully weighed, variation in the weights of successive batches is more than likely as the emptying of the drum is seldom complete and not generally uniform, and if not fully emptied the next batch will be overweight.

It is, therefore, an important object of this invention to provide a device or apparatus which will accurately measure and register the consistency of the concrete while it is being mixed and wherein fluctuation in the weight of the batch between wide limits has no appreciable effect upon the accuracy of the reading.

During the operation of a concrete mixer, the revolution of the drum carries the batch over to the ascending side of the drum. The extent to which this occurs depends upon the consistency of the batch. A wet watery batch will not be carried as far up the side of the drum as a dry stiff batch.

Obviously, this lateral displacement of the drum contents shifts the center of gravity of the batch; and as the amount of the lateral displacement is a direct function of the consistency of the batch, the resultant shift of the center of gravity affords a reliable measure of the consistency of the mixture.

It is, therefore, another object of this invention to provide a consistency meter for the purpose in mind which responds to this lateral shift in the center of gravity.

In this respect it is a further object of this invention to provide instrumentalities entirely free from springs and other variable devices, for producing motion indicative of the shift in the location of the center of gravity of the batch, which motion may be translated and multiplied in any desired manner, mechanically, hydraulically or electrically, into movement of a scale pointer or other suitable indicator by which the correctness or incorrectness and direction of incorrectness of the consistency will be accurately indicated.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 2 is a side view of the mixer;

Figure 3 is an enlarged cross sectional view through one of the cradle trunnions of the mixer taken through Figure 2 on the plane of the line 3—3;

Figure 4 is an enlarged front plan view of the instrument or mechanism by which a shift of the center of gravity of the drum contents is translated into motion which in turn is utilized to effect the desired indication;

Figure 5 is a side view of the mechanism shown in Figure 4;

Figures 6 and 7 are similar diagrammatic views to illustrate the manner in which a shift in the location of the center of gravity is utilized to produce the motion necessary for effecting the desired indication;

Figure 8 is a diagrammatic view of the complete system;

Figure 9 is a view similar to Figure 1 but illustrating the manner in which this invention may be applied to tilting type concrete mixers now in use;

Figure 12 is a view somewhat similar to Figure 1 but illustrating the application of this invention to nontilting mixtures as used on pavers;

Figure 13 is an end view of the mixer shown in Figure 12 taken on the plane of the line 13—13;

Figure 14 is a fragmentary detail view showing one manner of correcting for classification changes; and Figure 15 is an enlarged detail view illustrating the instrumentalities of the indicating mechanism employed in that embodiment of the invention shown in Figures 12 and 13.

Figure 1:
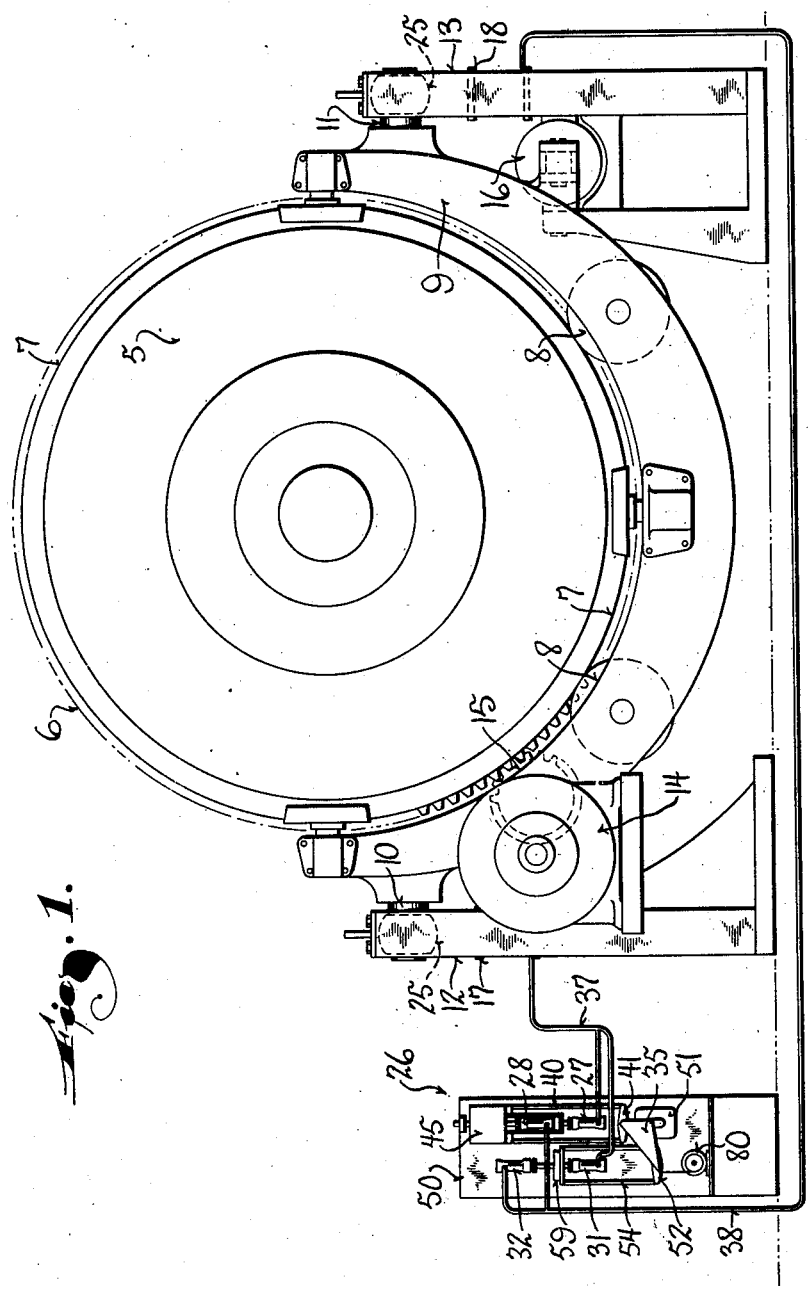
Figure 1 is an end view of a tilting type mixer illustrating one application of this invention.

In general terms, the invention consists in supporting the trunnions of the cradle in which the drum of a tilting mixer is suspended with its axis normal to the axis of the cradle trunnions, by means of hydraulic cylinders of the same size.

The reaction in each cylinder is thus directly proportional to the weight on the trunnion supported thereby. If the center of gravity of the drum and cradle structure shifts due to lateral shifting of the batch in the drum, the proportion of the weight carried by the two trunnions and consequently the reaction in their supporting cylinders changes correspondingly. This change in reaction thus can be utilized to ascertain change in the center of gravity.

The location of the center of gravity of a batch being mixed in the drum (with relation to the loads on the two cradle trunnions) depends upon the lateral position of the batch in the drum, and this depends upon the consistency of the batch. During mixing the batch is shifted laterally due to the tendency of the mixing action to cause the batch to follow the ascending side of the drum. This, consequently, shifts the load in the drum and carries its center of gravity away from one cradle trunnion and toward the other to an extent depending upon the consistency of the batch.

A wet, relatively fluid batch obviously will not be carried laterally as far as a dry, stiffer batch. A shift in the center of gravity of the batch less than a predetermined amount which represents the desired consistency would thus indicate a condition of excess wetness, while a shift in the center of gravity beyond the amount which represents the desired consistency would indicate a too dry condition of the batch.

The change in reaction in the hydraulic cylinders due to the shift in the center of gravity of the drum load thus may be utilized to determine and measure the consistency of the batch being mixed.

Through suitable mechanism these changes in reaction in the hydraulic cylinders are indicated to the operator on an appropriate gauge or scale so that the operator is at all times cognizant of the condition of the batch in the drum. Hence, if the batch is too dry or too wet, he can effect the necessary correction before dumping the batch.

Through careful weighing of the aggregates, an effort is made to adhere as closely as possible to a desired consistency but as is well known to those skilled in the art, there are many conditions which affect the consistency of concrete and mere weighing of the aggregates before charging the drum will not insure the maintenance of any desired consistency.

Hence, this invention is of extreme value to the operator, as it enables him to make corrections even while the batch is being mixed, so that all of the concrete delivered will meet the specifications.

As stated, it is the reaction in the hydraulic cylinders which support the cradle trunnions that is used to effect the desired indication. The manner in which this is accomplished perhaps will be best understood from the diagrammatic disclosures of Figures 6 and 7. However, before referring specifically to these diagrammatic disclosures, the structure of the mixer first will be generally described.

Several modes of the invention have been illustrated. Hence, the immediately following description will refer to that form of the invention shown in Figures 1 to 8, inclusive. As here shown, the mixing drum 5 has a double truncated cone formation with a ring gear 6 and a track 7 encircling its girth. The track rests on rolls 8 carried by a cradle 9, the opposite ends of which have trunnions 10 and 11 by which the cradle is supported on pedestals 12 and 13 in a manner to be described.

At its end adjacent to the trunnion 10 and the pedestal 12, the cradle mounts a drive motor and transmission indicated generally by the numeral 14 by which a pinion 15 meshing with the ring gear 6 is driven. Tilting mechanism of any suitable form such as a hydraulic ram 16 is provided adjacent to the other pedestal 13 for tilting the cradle and the drum to and from charging and discharging positions.

The structural features of the mixer form no part of this invention and thus need not be further described. If more specific data is desired regarding the structural features of this form of mixer, reference may be had to Patent No. 2,054,469, issued September 15, 1936.

The trunnions 10 and 11 are supported by hydraulic cylinders 17 aind 18, respectively. These cylinders are identical in size and construction, and as best shown in Figures 2 and 3 have their lower ends connected to their respective pedestals by pins 19 and have pistons 20 reciprocable therein. The connecting rods or rams 21 of the pistons pass through packing glands 22 at the top of the cylinders and are secured to journal boxes 23 slidable in suitable guideways 24 in the pedestals. The journal boxes 23 have bearings 25 swivelled therein and the cradle trunnions are journalled in these bearings.

Hence, it is evident that fluid in the cylinders under the pistons will be placed under pressure depending upon the weight on the trunnions.

Attention is now directed to the diagrammatic illustrations of Figures 6 and 7. It is to be understood, however, that these disclosures are purely diagrammatic and as will appear hereinafter have certain elements of the indicating mechanism illustrated in simplified form, and others omitted entirely.

The reactions in the cylinders 17 and 18 are duplicated in a mechanism indicated generally by the numeral 26, and which may be referred to as a pantograph board, inasmuch as the reactions at the cylinders 17 and 18 due to the weight of the batch and the shift of its center of gravity are reflected in miniature in this mechanism.

The essential elements of the pantograph mechanism are two small hydraulic cylinders 27 and 28, the pistons 29 and 30, respectively, of which both react upwardly in consequence to the weight of the drum contents as will appear hereinafter; and two other miniature cylinders 31 and 32, the pistons 33 and 34, respectively of which react to the weight respectively carried by the trunnions 10 and 11, and in a manner to be hereinafter described effect rocking motion of a lever member 35 about a fixed pivot 36.

It is the movement of this lever member 35 which provides the motion for the indicator mechanism by which the location of the center of gravity and any shift therein and consequently the consistency of the batch is visually indicated.

As stated, the cylinders on the pantograph board are of miniature proportions as compared to the hydraulic cylinders 17 and 18. In actual practice, these cylinders are five-eighths of an inch in diameter, while the cylinders 17 and 18 are several inches in diameter.

The pressure sides of the cylinders 17 and 18 are connected to the miniature cylinders on the pantograph board through suitable tubing. One line 37 connects the pressure side of the cylinder 17 with the miniature cylinders 27 and 31, while a line 38 connects the pressure side of the cylinder 18 with the miniature cylinders 28 and 32.

The pistons 29 and 30 of the miniature cylinders 27 and 28 both react upwardly against a counterweight platform 39.

This counterweight platform is connected through tugs or harness straps 40 with a whiffletree 41 pivoted as at 42 to the lever member 35. Hence an upward pull on the tugs 40 unless opposed, pulls the lever member 35 to the position shown in Figure 6 at which the whiffletree hitch 42 is in vertical alignment with the fixed pivot 36.

Attention is directed to the fact that the pistons 29 and 30 are exactly coaxial and are constrained to vertical motion on a line passing through the fixed pivot 36.

The pistons 33 and 34 in the miniature cylinders 31 and 32 are connected to the opposite ends of the lever member 35 by tug and whiffletree connections 43 and 44, respectively, so that an upward force on these pistons acts on the lever member 35 in a manner tending to impose a turning moment thereon, but inasmuch as their forces are applied on opposite sides of the fixed pivot 36 movement of the lever member depends upon a differential in the forces acting on the pistons 33 and 34.

Inasmuch as only the live load, i. e., the weight of the batch, and the shift in its center of gravity constitutes the basis for the consistency measurement, the effect of the dead weight of the drum, its cradle and associated mechanism should be cancelled out. This is conveniently accomplished by a weight 45 on the counterbalance platform 39 which balances the weight of the empty drum, its cradle and associated mechanism. The effect of the dead load on the pistons 33 and 34 is also subtracted or cancelled out by counterweights 46 and 47 supported by the pistons 33 and 34, respectively.

In the purely diagrammatic and illustrative showing of Figures 6 and 7 the load on the trunnions 10 and 11 is equal, hence the counterweights 46 and 47 are each one-half of the counterweight 45 which balances the total dead weight.

In actual practice, however, the motor 14 and its associated transmission being located adjacent to the trunnion 10, it follows that the load on the two trunnions is not the same. Hence, the counterweights 46 and 47 would be proportionately different. Moreover, as will appear hereinafter, in the actual pantograph mechanism the cylinders 31 and 32 are coaxial and their pistons are connected and oppose each other. The counterweight required, therefore, need be only the difference between the actual counterweights needed at 31 and 32 if the system were as shown in Figures 6 and 7.

If now the drum is charged with a batch of aggregates as shown in Figure 6 but with the drum stationary (that is, not revolving), an upward force on all of the pistons of the pantograph mechanism manifests the addition of this load on the trunnions, but as the proportion of the load carried by the two trunnions has not changed, no action occurs. A pull is merely exerted on the lever member 35 by the tug and whiffletree connection 40—41 proportional to the weight of the batch and one-half this pull is exerted on each of the opposite ends of the lever member by the tug and whiffletree connections 43 and 44.

However, when the drum revolves and the mass is carried laterally over toward the ascending side of the drum as shown in Figure 7, the center of gravity of the mass shifts to the left as indicated and as a consequence the load on the trunnion 10 is proportionately greater than the load on the trunnion 11.

The sum of the loads on the trunnions, however, remains the same. The pull exerted on the lever member 35 as a result of the upward reactions of the pistons 29 and 30 thus is not altered, for while the pressure in the line 37 and under the piston 29 has been increased, the pressure in the line 38 and under the piston 30 has been decreased by a like amount.

A different effect is produced at the cylinders 31 and 32 by this difference in fluid pressure in the lines 37 and 38. Here the increased pressure in the line 37 and the corresponding decrease in the line 38 exerts a greater upward pull on the left hand end of the lever member 35 than on the right hand end and as a result the lever member 35 rocks on its fixed pivot 36 until the turning moment imposed upon the lever member 35 by the response in the cylinders 31 and 32 is balanced by the turning moment imparted to the lever member 35 by the pull on the whiffletree connection 42 which, at this time is to the right of the vertical axis of the cylinders 27 and 28 and hence has a turning moment effective on the lever member.

To illustrate, consider that the upward pull on point 42 as a result of the sum of the reactions in cylinders 27 and 28 due to concrete in the drum is one hundred pounds, and that the pull on the whiffletree 43 is fifty-five pounds while the pull on whiffletree 44 is forty-five pounds because of the shift in center of gravity. These forces acting on the lever member will cause it to rock clockwise on its fixed pivot 36 until the turning moment on the lever member due to the ten pound differential between the pulls acting on the opposite ends thereof balances the turning moment applied on the lever member by the one hundred pound pull applied at point 42.

Assuming that the batch in the drum is of the proper consistency, the position which the lever member 35 assumes at this time can be utilized to indicate zero or desired consistency on a suitable indicator or gauge so that a shift in the position of the center of gravity due to either wetter or drier consistency will be reflected by motion of the lever member 35 about its pivot 36 in one direction or the other; and this motion properly translated to a pointer on a scale or other indicating medium, will indicate the variation from the desired consistency and enable the operator to make the necessary correction.

As noted hereinbefore the disclosure of Figures 6 and 7 are purely diagrammatic and are intended only to illustrate the manner in which the forces operate in the system to bring about the desired indication of the shift in center of gravity. In actual practice, the pantograph board and particularly the lever member 35 and the relationship of the cylinders 31 and 32 is different from that shown in Figures 6 and 7.

The actual construction of the pantograph board is as illustrated in Figures 4 and 5. It consists of a supporting panel 50 which may be secured to any suitable support adjacent to the mixer.

Secured to the panel 50 is a bracket 51 which supports the fixed pivot 36 on which the lever member 35 is pivoted. The lever member 35, however, instead of extending to opposite sides of the pivot 36 as in Figures 6 and 7 is of triangular or bell crank formation with one arm substantially horizontal and the other vertical. The upper or outer end of the vertical arm has the whiffletree 41 attached thereto at the point 42. The outer end of the horizontal arm has the effect of the differential in reaction in the cylinders 31 and 32 applied thereto by means of a whiffletree 52 pivoted to the lever member at 53 and tugs 54 which connect the whiffletree with a cross piece 55 which also serves as a counterweight platform. The cross piece 55 is fixed to the pistons or rams of the cylinders 31 and 32 which are opposed.

Inasmuch as it is essential that both sets of cylinders 27 and 28, and 31 and 32, are securely held in exact coaxiality, a special mounting bracket 56 is provided for each set of cylinders. These brackets are in the nature of channels having spaced flanges 56' between which the cylinders are positioned. Outwardly extending attaching flanges 57 on the channels enable the brackets to be bolted to the panel 50. Suitable pads are formed on the inner surfaces of the flanges 56' and on the bottom of the channel to enable accurate machining and insure properly located seats for the attaching portions or brackets 58 of the cylinders.

In this manner a simple and very rigid mounting is provided for the cylinders by which absolute coaxiality is assured between the cylinders of each pair.

As noted hereinbefore, the tug and whiffle tree connection between the lever member 35 and the connected rams of the cylinders 31 and 32 are attached to a crosspiece 55 which serves as a platform for the counterweight 59 necessary to cancel out the differential in dead load on the trunnions 10 and 11.

The counterweight platform 39 which supports the counterweight 45 is in the form of a disc having the piston rod or ram 30 of the cylinder 28 threaded therein. This disc 39 is also secured by means of screws or other fastenings to the upper end of a yoke 60 by which it is connected to the piston rod or ram 29 of the cylinder 27.

Specifically, the yoke 60 consists of a disc 61 in which the piston rod or ram 29 is threaded and two spaced parallel arms 62 which extend up alongside the cylinder and carry lateral extensions 63 on their upper ends into which the screws or other fastenings serving to hold the platform 39 to the yoke are threaded.

The hydraulic cylinders 17 and 18 and the miniature cylinders on the pantograph board have been defined as being connected by pipe lines 37 and 38 and in the description thus far it has been assumed that the system was maintained filled with liquid, specifically, oil.

To insure maintaining the fluid system full and to replenish loss which may occur past the pistons, suitable make-up apparatus is provided. This apparatus may consist of a pump 65 and a reservoir 66 connected with each of the main cylinders 17 and 18. As clearly shown in Figure 8, the outlet of each pump is connected with its respective main cylinder through a suitable feed line 67 in which a check valve 68 is incorporated, and with the reservoir by means of a return line 69 having a control valve 70 inserted therein.

The upper side of each of the main cylinders is also connected to the reservoir through a return line 71. It is to be understood, however, that the fluid in this line 71 is not under pressure.

The operation of the make-up apparatus may be manual but is preferably automatic. One manner of effecting the desired automatic operation of the apparatus is by means of a mechanical or other connection (indicated by the numeral 70' in Figure 8) between the bearing block 23 of each trunnion or a part movable therewith and its associated control valve 70. Through these connections the valves 70 are closed whenever the bearing blocks descend beyond a predetermined limit. Hence, loss of oil in the fluid system and under the piston 20 will effect closure of the valve 70 so that the constantly operating pump will force oil past the check valve 68 into the system.

To iron out vibrations and momentary shocks caused by the shaking of the supporting frame of the mixer due to loading or discharging an adjacent machine or any other vibrations producing disturbance, each of the pressure lines 37 and 38 has a needle valve 72 or other suitable constriction or choke incorporated therein.

Figure 11:
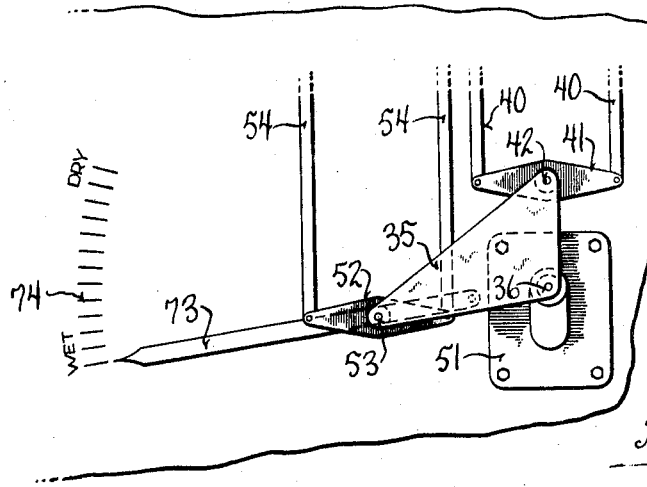
Figure 11 is a fragmentary detail view illustrating the manner in which the motion produced as a result of a shift in the center of gravity may be employed directly to effect the desired indication.

The manner in which a shift in the location of the center of gravity of the batch in the drum effects rocking motion of the lever member 35 has been described. It has also been noted that it is the movement of this lever member which produces the motion required to effect the desired indication. This movement may be utilized directly as shown in Figure 11 by merely attaching a pointer 73 to the lever member 35 to be moved across a scale 74 calibrated to afford an indication of the consistency of the batch.

Better results, however, are obtained by translating the motion of the lever member 35 by means of self-synchronous electrical motion transmitting devices such as Selsyn motors, into the desired indicator movement and in Figure 8 the application of this form of motion transmission is illustrated.

In this instance, the outer end of the lever member 35 is connected mechanically to the motor of a Selsyn transmitter 80 which is connected electrically with a Selsyn receiver 81. The receiver operates the pointer 82 of a gauge indicated generally by the numeral 83 and including a scale 84 with which the pointer cooperates.

To insure accuracy over a wide range of concrete classifications, a classification adjustor may be incorporated in the gauge 83. A simple form of classification adjustor is illustrated in Figure 14. As here shown the scale or dial 84' is adjustable about the pivot axis of the pointer so that it may be set with relation to the range of motion of the pointer. Any suitable means for setting the dial such as a window 85 in the frame or housing of the gauge and cooperating station or classification indicia 86 on the scale may be employed in conjunction with some means for setting the scale as for instance a handle 87 projecting from the housing of the gauge.

Figure 10:
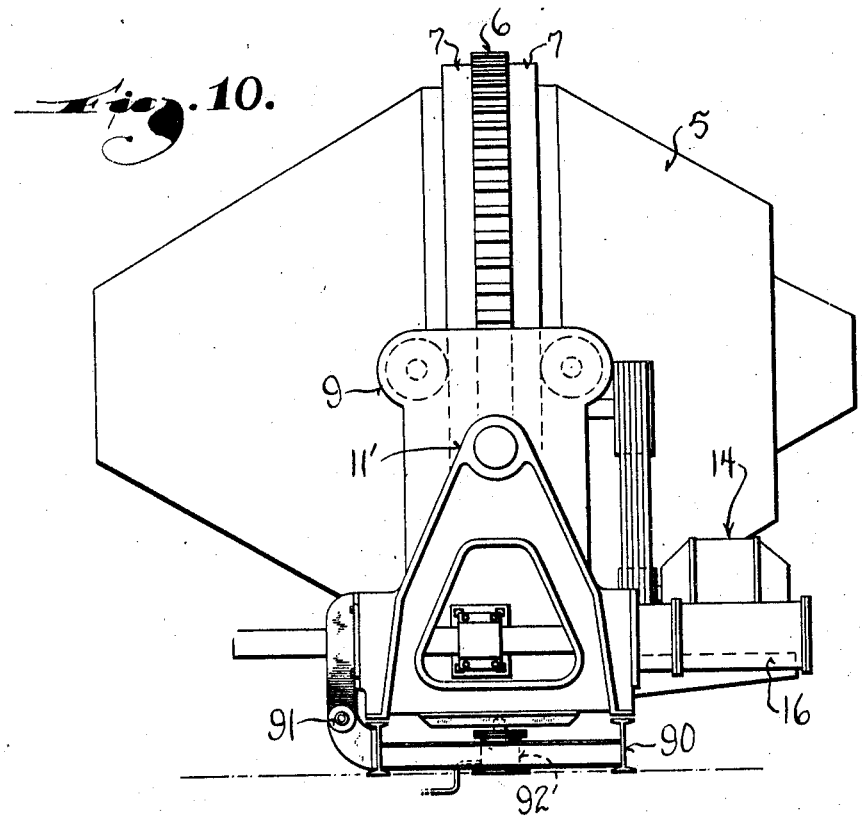
Figure 10 is a side view of the mixer shown in Figure 9.

The consistency meter described thus far is premised upon the use of a specially built mixer in that the main cylinders 17 and 18 are built directly into the pedestals 10 and 11. The invention, however, is also easily applied to tilting mixers of the type now in use and in Figures 9 and 10, one form of this application is illustrated.

As here shown, the standard pedestals 10' and 11' are used to mount the cradle but instead of being bolted directly to the base 90 as before, the pedestals are hinged to the base as at 91 and under each pedestal is a hydraulic cylinder 92, the ram or piston rod of which extends upwardly from the cylinder to support the pedestal.

In this manner the load on each pedestal trunnion is manifested by a proportional fluid pressure in the cylinders and this fluid pressure may be utilized in the manner described to effect the desired consistency measurement.

While the consistency meter of this invention is particularly applicable to the tilting type of concrete mixer, it is, of course, also susceptible for use with the non-tilting type of mixer such as used on pavers. But inasmuch as the scheme described involves considerable mechanical complexity when applied to non-tilting mixers and especially pavers due to the various drive requirements of these mixers, the slightly modified embodiment of the invention shown in Figures 12, 13 and 15 has been provided for the adaptation of the invention to non-tilting mixers.

In this case, the mixing drum 100 is supported on rollers carried by a cradle 101. One end of the cradle has a fixed pivotal support 102. Its other end is supported by a hydraulic cylinder 103. This cylinder, like the cylinders 17 and 18, is pivoted as at 104 to the supporting base, while its ram or piston rod 105 connects with the free end of the cradle so that a load on the cradle applies pressure on the fluid in the cylinder 103.

A load on the piston of the cylinder 103 is thus manifested by an upward reaction in a miniature cylinder 106 with which the cylinder 103 is connected through a suitable pipe line 107.

The miniature cylinder 106 forms part of a pantograph mechanism indicated generally by the numeral 108 and which in addition to the cylinder 106 includes another similar cylinder 109, and a lever member 110 pivoted to the panel board of the mechanism as at 111 which point is in line with the axis of the cylinder 106.

The lever member 110 is of triangular formation as previously described, and the ram or piston of the cylinder 109 is tied to the outer end of the lever member through a tug and whiffletree connection 112, while the piston or ram of the cylinder 106 is tied to the upper end of the lever member through a tug and whiffletree connection 113.

The miniature cylinder 109 is connected with a cylinder 114 through a pipe line 115 so that pressure in the latter cylinder effects an upward reaction in the cylinder 109. The cylinder 114 is supported on the free end of the cradle and has its ram or piston connected with the shaft of a drive pinion 116. This drive pinion meshes with the ring gear 117 on the drum and drives the drum in the direction of the arrow in Figure 12.

A lever 118 supported on a fixed pivot 119 holds the pinion in mesh with the ring gear. The fixed pivot 119 is carried by a stationary pedestal 120 which also provides a stop 121 to cooperate with a stop 122 on the lever 118 to limit upward swinging movement of the lever.

Obviously, in the transmission of driving force by the pinion to the drum in the direction indicated by the arrow in Figure 12, a downward thrust is imposed on the shaft of the pinion which is transmitted to the piston in the cylinder 114 so that the pressure in this cylinder and consequently the reaction in the cylinder 109 is proportional to the torque load on the pinion. It is to be noted, though, that the load carried by the cylinder 114 is added to the dead load (the weight of the drum, its cradle and associated mechanism) on the cylinder 103. Hence, it is possible by means of a weight 123 on a counterweight platform supported by the piston of the cylinder 106 and a weight 126 similarly supported on the piston of the cylinder 109 to cancel out the effect at the pantograph mechanism of the dead weight and the friction load on the pinion which obtains while the drum is revolving empty.

The pantograph lever member 110 is thus left undisturbed and the pointer 124 which is connected with the piston of the cylinder 109 remains off the scale.

When the drum is loaded, its contents will assume a position placing the center of gravity thereof somewhere between the vertical median plane passing through the drum axis and the ascending side of the drum where the cylinders 103 and 114 are located depending upon the consistency of the batch. The reaction at the cylinder 103 due to this load thus is $$\frac{L(a+b)}{b+c}$$

where:

$L$ is the load,
$a$ is distance the center of gravity is out from the median plane through the drum axis,
$b$ is the distance between said median plane and the axis of the cradle pivot 102, and
$c$ is the distance between said median plane and the approximate axis of cylinders 103 and 114.

The reaction at the cylinder 114 is proportional to $$\frac{La}{c}$$

inasmuch as the turning moment now to be considered is about the axis of the drum, it being assumed for purpose of illustration that the cylinders 103 and 114 are approximately coaxial.

These pressures at the cylinders 103 and 114 produce upward reactions in their respective miniature cylinders 106 and 109, which in turn swings the lever member 110 on its pivot. Inasmuch as the angle through which the lever member 110 traverses is a function of $$\frac{La}{c} \div \frac{L(a+b)}{b+c}$$

L may be cancelled from both sides and the angle is then a function of the variable distance $a$ and some constant determined by the structure of the machine. In other words, the location of the center of gravity of the batch in the drum without effect from changes in the weight of the load L determines the reading obtained.

To preclude interference with the torque reactions on the pinion, its drive is applied thereto through a plurality of flexible couplings 125.

Inasmuch as this form of the invention is designed with a view toward its incorporation in pavers which very often are operated on an incline, means are provided for adjusting the pantograph mechanism to compensate for errors which would otherwise exist because of the angles involved. To this end the tug and whiffletrees by which the pistons or rams of the miniature cylinders are connected with the lever member are provided with adjustments as clearly shown in Figure 15. By virtue of these adjustments the points of force application to the pantograph lever may be adjusted toward and from its fixed pivot 111.

From the foregoing description taken in connection with the accompanying drawings, it will be apparent to those skilled in the art that this invention provides unprecedented accuracy in the determination of the consistency of concrete being mixed, for it is only the location of the center of gravity of the batch which controls the functioning of the meter mechanism.

It is to be understood, however, that a constant speed of drum rotation or a speedometer to indicate the speed of the drum so that the reading may be taken only when the drum rotates at the desired speed, is required to insure the results sought, for obviously the extent of lateral displacement which the batch undergoes during the mixing action is dependent upon the speed of drum rotation as well as the consistency of the batch.

What I claim as my invention is:

1. In an apparatus of the character described: a rotatable mixing drum; drum supports at opposite sides of the drum; a lever member having a fixed pivot; means for applying the reaction force at both of the drum supports to a point on the lever member spaced from its pivot in a manner such that the sum of the reaction forces at said drum supports is at all times applied to said point on the lever member; means for applying the reaction forces at both of said drum supports to another point on the lever member spaced from its pivot but in a manner such that the reaction forces at the drum supports oppose each other in their effect on the lever member and produce a turning moment on the lever member in opposition to the turning moment produced by the sum of the reaction forces on the lever member so that changes in the ratio of the load carried by the two drum supports due to shift in the center of gravity of the drum contents rock the lever on its fixed pivot; and means actuated by rocking motion of the lever member thus produced for operating an indicator on which a true function of the shift in the center of gravity of the drum contents is manifested.

2. In combination with a mixing drum revolving at a known speed: means for determining the consistency of a batch being mixed therein comprising, spaced supports for the drum at opposite sides of a vertical plane passing through the axis of the drum so that the ratio of the load on said supports depends upon the position of the center of gravity of the batch in the drum, which in turn depends upon the consistency of the batch due to its tendency to follow up the ascending side of the drum an extent dependent upon the consistency of the mixture; a main hydraulic cylinder under each of said spaced supports and subject to the load thereon; a plurality of miniature cylinders; pressure lines connecting the main cylinders with said miniature cylinders so that the reactions in said main cylinders are manifested in said miniature cylinders; a movable indicator driving member; means connecting the movable elements of said miniature cylinders with said indicator driving member to cause the indicator driving member to respond proportionately to changes in the ratio of the loads on the main cylinders; and an indicator driven by said movable indicator driving member.

3. In combination with a mixing drum revolving at a known speed: means for determining the consistency of a batch being mixed therein comprising, spaced supports for the drum at opposite sides of a vertical plane passing through the axis of the drum so that the ratio of the load carried by said supports depends upon the position of the center of gravity of the batch in the drum, which in turn depends upon the consistency of the batch due to its tendency to follow up the ascending side of the drum an extent dependent upon the consistency of the mixture; a pivoted lever member; a main hydraulic cylinder under each of said spaced supports and subject to the load thereon; a pair of miniature cylinders having their movable elements acting in the same direction on a point on the pivoted lever member spaced from its pivot; a second pair of miniature cylinders having their movable elements connected with the lever member at another point but in a manner such that their forces oppose each other in their effect on the lever member; a fluid pressure line connecting one of the main cylinders with one of each pair of the miniature cylinders; another fluid pressure line connecting the other of the main cylinders with the other one of each pair of miniature cylinders to produce motion of the pivoted lever member in accordance with change in the load on the drum supports occasioned by a shift in the center of gravity of the batch in the drum; and means driven by motion of the lever member for actuating an indicator on which the correctness, incorrectness and direction of incorrectness of the consistency are indicated.

4. Means for determining the consistency of a mixture while it is being mixed, comprising: a mixing drum rotatable at a known or constant speed and in which the batch being mixed follows up the ascending side of the drum an extent depending upon the consistency of the mixture so that the center of gravity of the batch lies between a vertical plane passing through the axis of the drum, and the ascending side of the drum; hydraulic cylinders at opposite sides of said vertical plane; means supporting the drum on said cylinders so that the weight of the drum and its contents is carried by said cylinders and the ratio of the loads carried by the cylinders varies with the location of the center of gravity of the batch whereby the relative pressures in said cylinders is a measure of the consistency of the mixture; indicator means on which the correctness, incorrectness and direction of incorrectness of the consistency are shown; and fluid pressure responsive means connected with said cylinders and the indicator mean and through which changes in the ratio of the loads carried by the cylinders due to changes in the consistency of the mixture are reflected on the indicator means.

5. Means for determining the consistency of a mixture while it is being mixed, comprising: a mixing drum rotatable at a known or constant speed and in which the batch being mixed follows up the ascending side of the drum an extent depending upon the consistency of the mixture so that the center of gravity of the batch lies between a vertical plane passing through the axis of the drum, and the ascending side of the drum; hydraulic cylinders at opposite sides of said vertical plane; means supporting the drum on said cylinders so that the dead load of the drum and its associated structure and the live load consisting of the drum contents is carried by said cylinders and the ratio of the loads carried by the cylinders varies with the location of the center of gravity of the batch whereby the relative pressures in said cylinders is a measure of the consistency of the mixture; indicator means on which the correctness, incorrectness and direction of incorrectness of the consistency are shown; fluid pressure responsive means connected with said cylinders and the indicator means and through which changes in the ratio of the loads carried by the cylinders due to changes in the consistency of the mixture are reflected on the indicator means; and means for counter-balancing the fluid pressure resulting from the dead load on the cylinders so that only the fluid pressure produced by the live load is effective to actuate the indicator means.

6. In an apparatus for determining the consistency of a mixture while it is being mixed, the combination of: a rotatable mixing drum; a cradle on which the drum is rotatably supported with its axis substantially horizontal; a fixed pivot supporting one end of the cradle; load responsive means supporting the opposite end of the cradle so that the weight on the cradle is manifested at said load responsive means; a ring gear on the drum; a drive pinion meshing with the ring gear; a second load responsive means supporting the drive pinion and responding to its reaction torque, said second load responsive means resting on the first mentioned load responsive means; an indicator on which the correctness, incorrectness and direction of incorrectness of the conistency are indicated; and means actuated by the reaction forces in said two load responsive means for driving said indicator.

7. In an apparatus for determining the consistency of a mixture while it is being mixed, the combination of: a rotatable mixing drum, a cradle supporting the drum for revolution on a substantially horizontal axis; a fixed pivot supporting one end of the cradle; a hydraulic cylinder supporting the other end of the cradle; a drive pinion for revolving the drum; a hydraulic cylinder supporting the drive pinion and responsive to the reaction torque imposed thereon by the drum and its contents which load varies with consistency of the batch being mixed; means supporting the second hydraulic cylinder on the first hydraulic cylinder; and fluid pressure responsive means utilizing the reaction forces in said hydraulic cylinders for effecting an indication of the consistency of the batch.

8. Means for determining the consistency of a batch of concrete being mixed in a non-tilting mixer comprising, the combination of: a rotatable mixing drum; a cradle on which the drum is rotatably supported to revolve about a substantially horizontal axis; a fixed pivotal support for the end of the cradle adjacent to one side of the drum; a hydraulic cylinder supporting the opposite end of the cradle; a drive pinion for revolving the drum; a hydraulic cylinder supporting the drive pinion to receive the thrust imposed thereon by the load of the drum and its contents; means connecting said last named cylinder with the first named cylinder so that the thrust of the pinion is also applied to the first named cylinder; an indicator on which the correctness, incorrectness and direction of incorrectness of the consistency are shown; fluid pressure responsive means for actuating said indicator; and pressure lines connecting said fluid pressure responsive means with the cylinders so that an increase in the thrust on the second designated cylinder above that which obtains when the drum is revolving empty, due to the batch assuming a position in the drum at which its center of gravity lies between the vertical plane passing through the axis of the drum and the ascending side of the drum, manifests a response at the indicator proportional to the location of the center of gravity of the batch in the drum.

9. In a non-tilting type mixer: a revoluble mixing drum; means for weighing a mixture while it is being mixed therein; means for revolving the drum; means for measuring the torque required to revolve the drum; and means for comparing the weight of the mixture and the torque and thereby ascertaining the location of the center of gravity of the mixture and consequently the consistency of the mixture.

10. In a concrete mixer of the tilting type having a rotatable mixing drum supported on a cradle provided with trunnions: a base; pedestals in which the trunnions are supported; means hingedly connecting each pedestal with the base, the axes of the hinge connection being spaced from a vertical plane passing through the trunnions of the cradle so that the pedestals are swingable toward and from the base; and a hydraulic cylinder under each pedestal so that the load carried by the pedestal is manifested by a reaction in the cylinder under it.

11. In a concrete mixer of the tilting type having a rotatable mixing drum supported on a cradle provided with trunnions: a base; pedestals in which the trunnions are supported; means hingedly connecting each pedestal with the base, the axes of the hinge connection being spaced from a vertical plane passing through the trunnions of the cradle so that the pedestals are swingable toward and from the base; a hydraulic cylinder under each pedestal so that the load carried by the pedestal is manifested by a reaction in the cylinder under it; and means actuated by fluid pressure in said cylinders for indicating a true function of the ratio of the loads carried by the pedestals.

12. An apparatus for determining the consistency of a mixture while it is being mixed, comprising: a rotatable mixing drum; means responsive to the weight of the mixture in the drum to produce a force; means responsive to change in the location of the center of gravity of the mixture in the drum, which location depends upon the consistency of the mixture, to produce another force; means for translating said two forces into opposed turning moments acting about a common fixed moment center; and indicator means actuated by the balancing of the opposed turning moments.

13. Apparatus for determining the consistency of a mixture while it is being mixed, comprising: a rotatable mixing drum; load responsive means supporting the drum so that the combined weight of the drum, its associated mechanism and the mixture in the drum is impressed on said load responsive means; indicator means on which the correctness, incorrectness and direction of incorrectness of the consistency of the mixture is shown; operating mechanism for the indicator means connected with the load responsive means to be actuated thereby and including means for producing a force which is proportional to the combined weight of the drum, its associated mechanism and the mixture in the drum, means responsive to the combined weight of the drum, its associated mechanism and the mixture in the drum for producing a force which varies directly with shifts in the center of gravity of the mixture during the mixing action, and means for applying the effect of said forces opposed to each other on the indicator means; and means for cancelling out the effect at said indicator operating mechanism of the dead weight consisting of the weight of the drum and its associated mechanism so that only the weight of the mixture in the drum is manifested at said indicator operating mechanism.

14. Apparatus for determining the consistency of a mixture while it is being mixed, comprising: a drum rotating at a known speed so that the mixture in the drum tends to follow up the ascending side of the drum to an extent depending upon its consistency and the center of gravity of the mixture in the drum lies between a vertical plane coinciding with the axis of rotation and the ascending side of the drum; supports for the drum at opposite sides of said vertical plane including hydraulic cylinders in which the fluid is placed under pressure by the load so that the reactions in said cylinders reflect the position of the center of gravity of the mixture in the drum; means connected with both of said hydraulic cylinders through which the reactions in the cylinders combine, to produce a force which is proportional to the sum of the loads on said cylinders; means connected with both of said hydraulic cylinders through which the reactions in said cylinders oppose each other to produce another force which varies directly with shifts in the center of gravity of the mixture in the drum; an indicator; and indicator operating mechanism connected with the indicator and said two force producing means and through which said two forces act in opposition to each other to cause the indicator to show a comparison of said two forces.

15. In an apparatus of the character described: a drum rotating at a known speed so that material in the drum tends to follow up the ascending side of the drum to extent depending upon its consistency and the center of gravity of the material in the drum lies between a vertical plane coinciding with the axis of rotation and the ascending side of the drum; supporting means for the drum at opposite sides of said vertical plane, each of said supporting means including a load responsive element subjected to the load applied on said supporting means; a lever member having a fixed pivot; means connected with said load responsive elements and said lever member through which the reactions at said load responsive elements combine to create a turning moment acting through the pivoted lever member; means also connected with said load responsive elements and said lever member through which the reactions at said load responsive elements oppose each other and their resultant creates an opposite turning moment acting through the pivoted lever member; and indicator means driven by the motion of said lever member about its pivot produced during the balancing of said opposed turning moments.

16. In combination with a rotatable mixing drum revolving at a known speed and in which the batch being mixed rides up the ascending side of the drum an extent depending upon the consistency of the mixture so that the center of gravity of the batch being mixed assumes a position out from the median plane passing vertically through the axis of the drum, means for determining the consistency of the mixture while it is being mixed comprising: an indicator on which the correctness, incorrectness and direction of incorrectness of the consistency of the mixture are shown; an indicator driving member connected with the indicator to actuate the same; a fixed pivot for said member; means responsive to the weight of the batch in the drum for producing a force; means for applying said force on the indicator driving member; means responsive to shift in the center of gravity of the batch for producing another force; and means for applying said other force on the indicator driving member in opposition to the first named force.

17. An apparatus for determining the consistency of a mixture while it is being mixed comprising: a rotable mixing drum; means responsive to the weight of the mixture in the drum to produce a force which is a known function of the weight of the batch; means responsive to shift in the location of the center of gravity of the mixture in the drum, which location depends upon the consistency of the mixture, to produce another force which is a known function of the weight of the batch and the degree of shift in the location of its center of gravity; an indicator; and means upon which said two forces act in opposition to each other connected with the indicator to actuate the same and effect a comparison of the forces, said last named means including means for cancelling out the effect of the weight of the batch on the comparison so that the comparison is a true function of the shift of the center of gravity only and therefore a true measurement of the consistency of the mixture.

18. An apparatus for determining the consistency of a mixture while it is being mixed comprising: a rotatable mixing drum; means responsive to the weight of the mixture in the drum to produce a force; means responsive to shift in the center of gravity of the mixture in the drum to produce another force; means upon which said forces act in opposition to each other to effect a comparison thereof and by which the effect of the weight of the batch on the comparison is nullified so that the comparison is a true function of the shift in the center of gravity; and an indicator actuated by said last named means and upon which the correctness, incorrectness and direction of incorrectness of the consistency of the mixture are indicated.

19. In an apparatus of the character described: a drum rotating at a known speed so that material in the drum tends to follow up the ascending side of the drum to an extent depending upon its consistency and the center of gravity of the material in the drum lies between a vertical plane coinciding with the axis of rotation and the ascending side of the drum; load responsive means at opposite sides of said vertical plane; means supporting the drum on said load responsive means so that the dead load of the drum and its associated structure as well as the live load consisting of the drum contents is carried by said load responsive means and the ratio of the loads thereon varies with changes in the location of the center of gravity of the batch, whereby the relationship between the reaction at said load responsive means is a measure of the consistency of the mixture; indicator means on which the correctness, incorrectness and direction of incorrectness of the consistency are shown; means connected with said load responsive means and the indicator means and through which changes in the ratio of the loads on the load responsive means due to changes in the consistency of the mixture are reflected on the indicator means; and means for counterbalancing the affect of the dead load so that only the effect of the live load is effective to actuate the indicator means.

20. An apparatus for determining the consistency of a mixture while it is being mixed comprising: a rotatable mixing drum; means responsive to the weight of the mixture in the drum to produce a force which is always proportional to the weight of the batch regardless of shift in its center of gravity; means responsive to the weight of the batch as manifested at a plurality of points and producing a force which varies directly with shifts in the center of gravity of the batch; an indicator; and means upon which said two forces act in opposition to each other connected with the indicator to actuate the same and effect a comparison of the forces and by which the effect of the weight of the batch on the comparison is nullified so that the comparison is a true function of the shift in the center of gravity of the batch and consequently an indication of the consistency of the mixture.

21. An apparatus for determining the consistency of a mixture while it is being mixed comprising: a rotatable mixing drum; means for rotating the drum; means responsive to the weight of the mixture in the drum and shift in its center of gravity to produce a force; means responsive to the torque of the drum driving means which varies with the weight of the mixture and shifts in its center of gravity for producing another force; means upon which said two forces act in opposition to each other; and an indicator driven by said last named means and upon which the correctness, incorrectness and direction of incorrectness of the consistency are shown.

GLENWAY MAXON, Jr.